May 6, 1941.  A. BOECLER ET AL  2,241,177
PRODUCTION OF HOLLOW ARTICLES
Filed Dec. 31, 1938  4 Sheets-Sheet 1
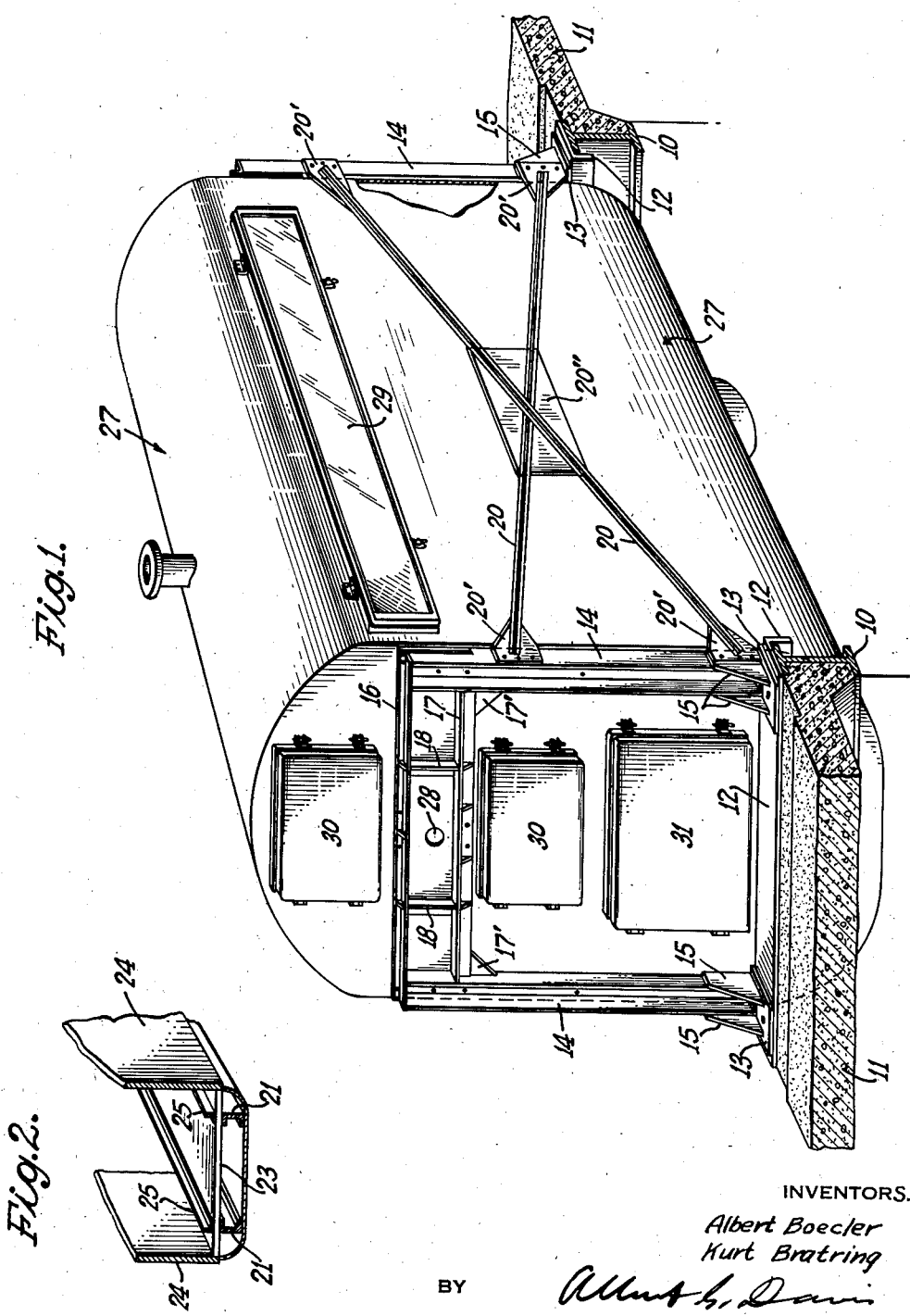
INVENTORS.
Albert Boecler
Kurt Bratring
BY
ATTORNEY

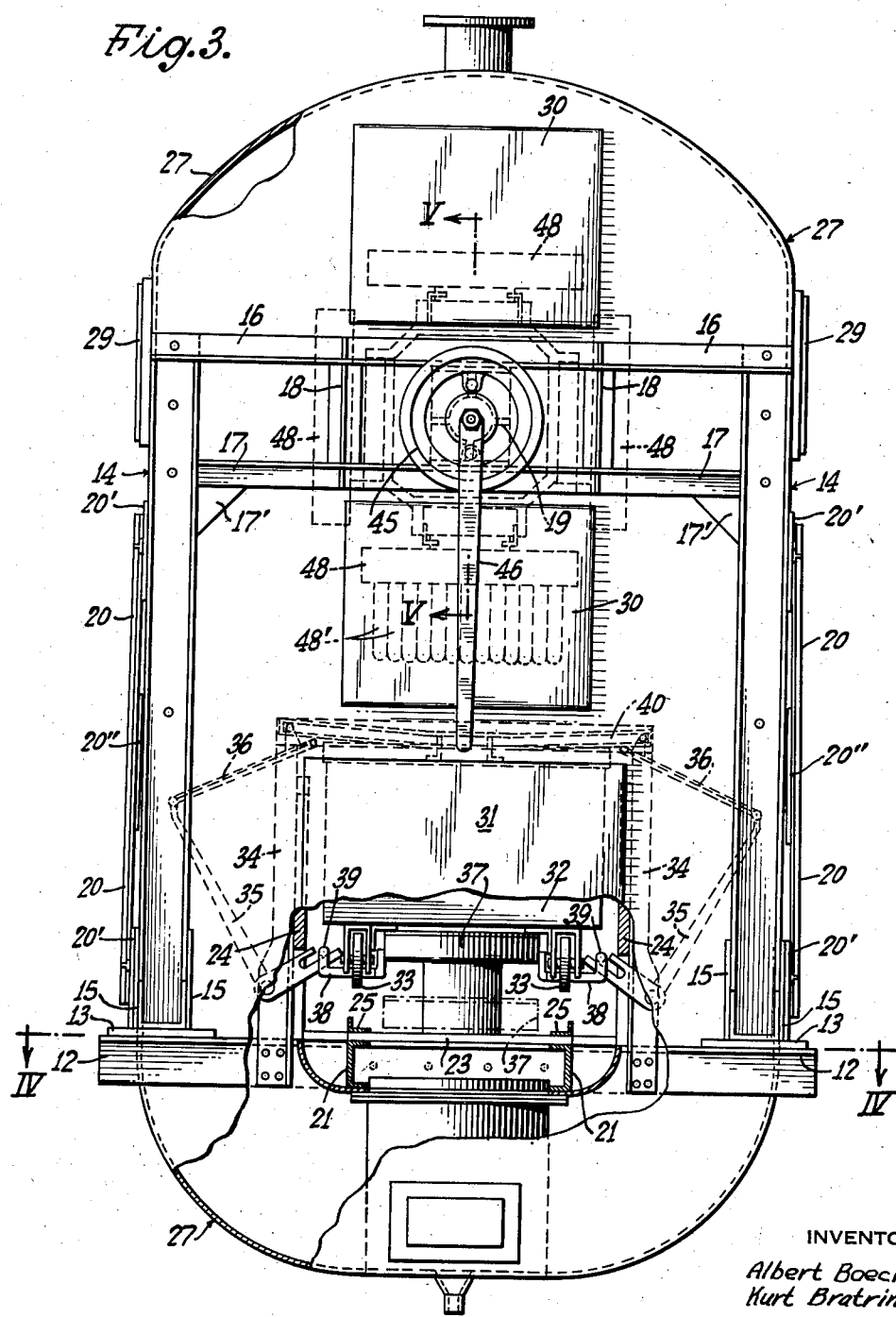

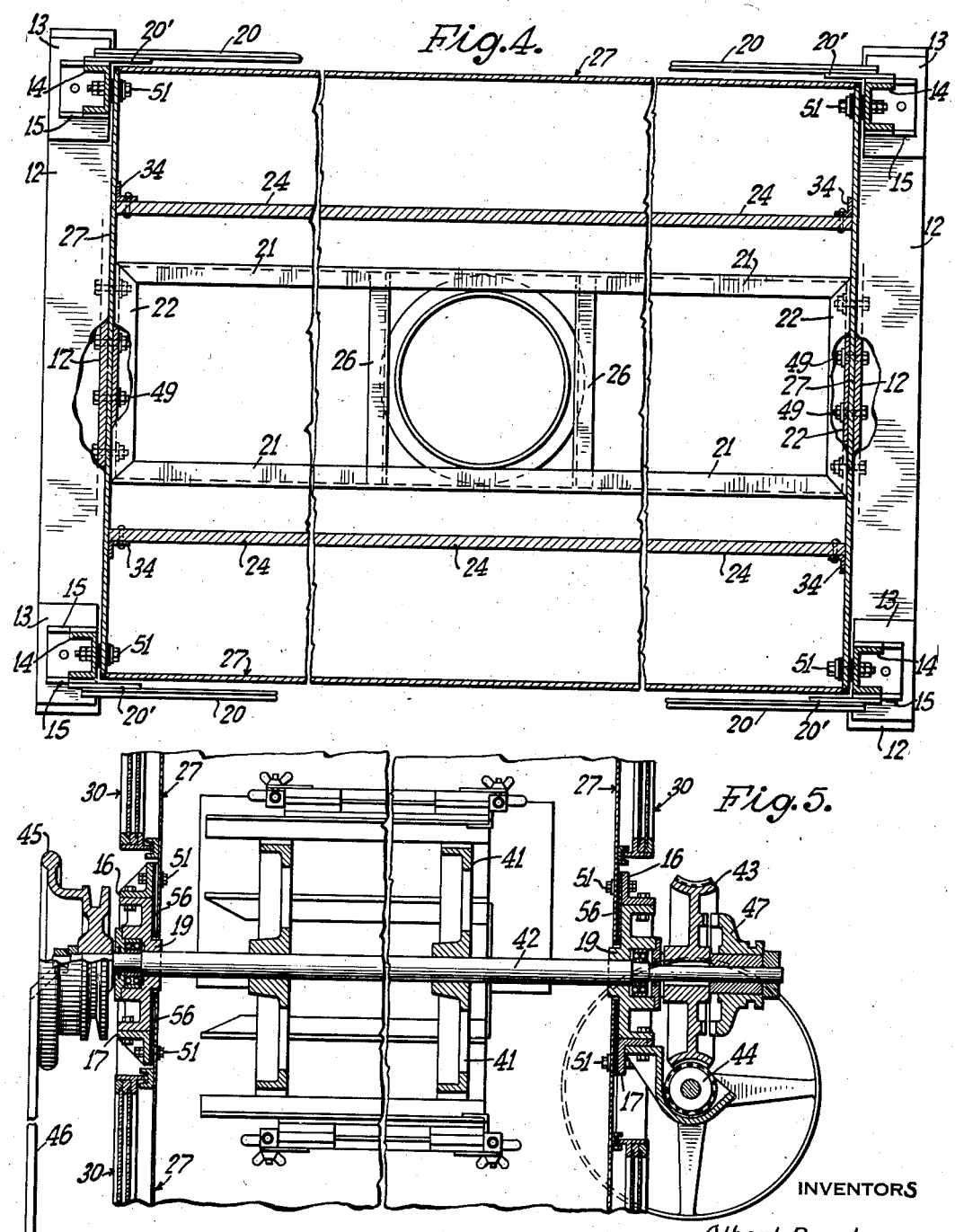

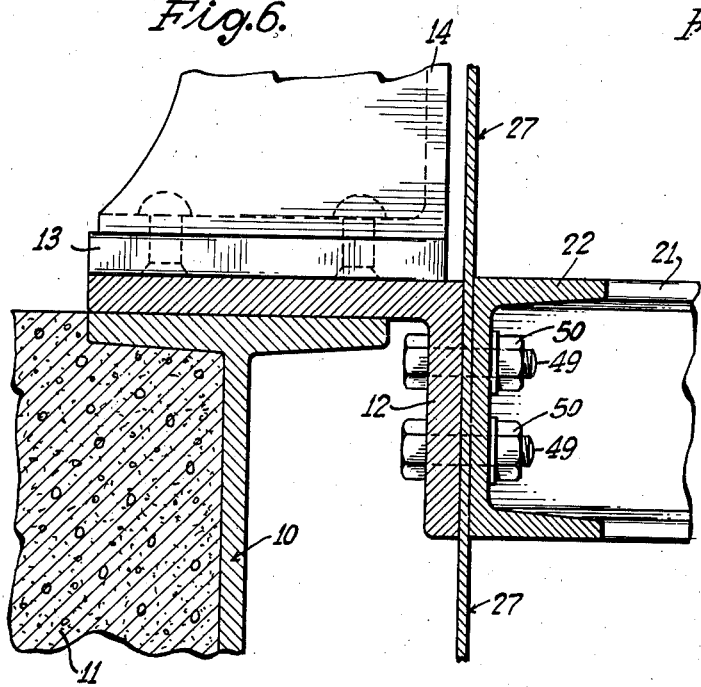
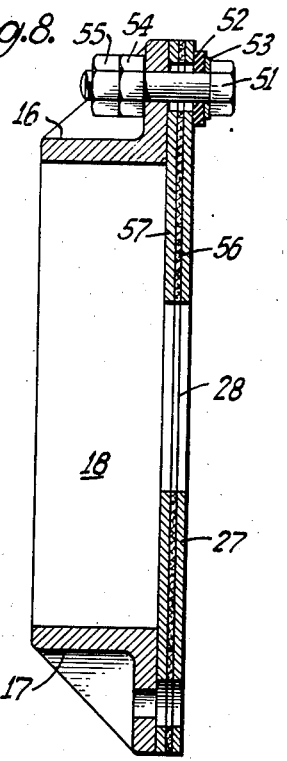
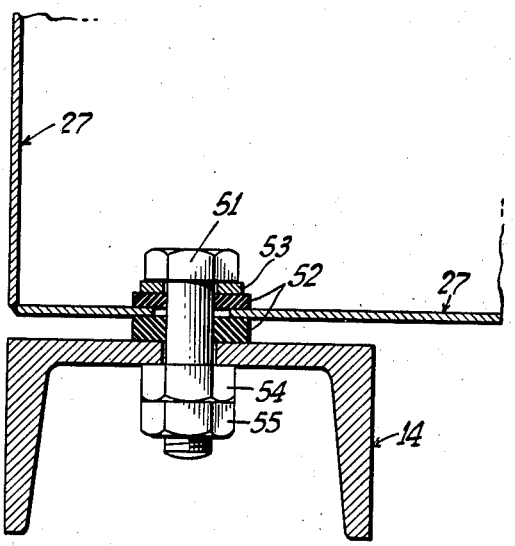

Patented May 6, 1941

2,241,177

UNITED STATES PATENT OFFICE 2,241,177

PRODUCTION OF HOLLOW ARTICLES

Albert Boecler, Berlin, and Kurt Bratring, Dahlem, Berlin, Germany, assignors, by direct and mesne assignments, to Neocell Products Corporation, a corporation of Delaware Application December 31, 1938, Serial No. 248,752 In Germany June 18, 1938

2 Claims. (Cl. 18—24)

The invention of this application, which is a continuation in part of our application Ser. No. 218,323, filed July 9, 1938, relates to the production of hollow articles by dipping.

In such production as carried out commercially on a large scale, we have experienced a very considerable loss due to irregularity in the thickness of the wall of the finished formed article; we often find, for example, a sort of ring, where the thickness is greater than it is at other portions of the article, or we find one or more waves of thickness in the wall. For a long time it did not seem possible to explain this phenomenon, or to find out what it was that caused the trouble. The difficulty was a serious one; while it varied from day to day, it was sufficient on many days to cause the rejection of considerably over ten per cent of the articles produced and otherwise suitable for shipment. Many millions of articles were produced, and hundreds of thousands of articles were rejected for this reason, before we were able by the invention herein disclosed to overcome the difficulty.

In manufacturing operations of the character under discussion it is usual to mount a number of molds quite closely together on a frame, and to insert a series, two or more, of such frames in a dipping machine. The member carrying the frames is rotated so as to present the frames in turn in proper position for the dipping operation; that is to say with the molds depending vertically from the frame over the dipping tank. The dipping tank, which is normally covered to reduce the evaporation and loss of the solvent, is then uncovered, and the dipping operation is performed, preferably by lifting the tank by a hydraulic piston until the molds enter the dipping bath to the desired depth. The tank is then withdrawn, the covers are closed, and the frame is rotated 180°, so that instead of hanging down the molds which have just been dipped stand upright. At the same time another frame of molds is presented in position for the dipping operation. These molds are then dipped in turn, and in turn inverted.

We finally discovered that the irregularities in the form of the finished article which led to the rejection of so large a percentage of the product, as described above were indirectly due to the vibration of the apparatus caused by shocks due to the opening and closing of the covers, starting and stopping the rotation of the dipping frames, working the hydraulic piston to lift and lower the dipping tank, etc. Whatever form the dipping machine may take, such shocks are inevitable. We say "indirectly," because as we have now found the most serious part of the irregularities is the direct result of atmosphere waves inside the machine, rather than of any direct transmission of vibration to the mold frames.

The solvents, usually acetone, used in these processes are costly, and must be recovered as far as practically possible. To prevent their escape and permit of their recovery, it is necessary that the dipping machine be thoroughly housed. It has been customary to accomplish this by building up a strong gastight housing of stiff iron sheets securely welded together and mounting the mold frame carrier and other moving parts directly on this housing. The result has been that the surface of the housing, by which term in this specification we refer to the enclosure which separates the atmosphere surrounding the frames from the atmosphere of the room in which the machines are placed, is set into vibration by mechanical transmission to the housing of vibrations set up in the frame of the machine by the mechanical shocks referred to above. These shocks cannot be avoided, though their effect may be reduced somewhat by good solid mechanical construction.

The vibrations of the housing are communicated to the atmosphere which it contains, in the form of atmosphere waves. When a number of machines are operating in the same room, it is often found that different machines react on each other, so as to intensify the vibration and the resulting air waves. Apparently at times a condition of resonance exists.

The atmosphere waves thus produced act upon the film which surrounds each mold after the dipping process, which film is liquid immediately after the dipping, and slowly hardens in the machine. The waves seem to have nodes and loops at various points on the length of the mold; these nodes and loops tend to force some of the liquid from its proper position to some other position, and thus to cause irregularities of the film thickness. Further, these air waves set up waves on the surface of the dipping bath, as wind blowing across water causes waves to form on its surface. One of these waves, passing across the mold as it is leaving the bath, will leave a ring on the surface of the material at that level, which ring may not be entirely equalized before the film has dried.

We avoid these difficulties, and greatly reduce the percentage of rejected articles, in the following manner:

We provide a very strong, substantial base for the machine, which is firmly anchored to a suitable foundation, which, like the foundation of any other industrial machine, may be a separate mass of cement or concrete, or may consist of heavy cross beams of the flooring of the factory building. On this base we mount strong, well-braced uprights, and on these uprights we mount strong, well-braced beams which carry the bearings for the shaft of the mold frame carrier. We firmly attach to the base heavy rails in the form of angle bars, which support the dipping tank in its normal position. The whole forms a strong statically closed supporting structure. All the moving parts of the machine, other than the rotary mold frame carrier, are mounted directly on the massive base.

We next provide a complete, independent housing structure, and attach it to the frame at only one level, and that at a minimum number of points, which are selected because they are points of minimum vibration; at all other points the housing is merely guided by the structure of the machine itself, by such guiding connections as avoid to the greatest possible extent the transmission of vibration to it. Thus the housing is a closed, self-supporting structure, statically attached to the supporting framework above described, and dynamically separate therefrom.

In this manner we are able to avoid the difficulties recited above, and to add materially, frequently more than ten per cent, to the number of salable articles produced on a given machine in a day.

The invention will be more fully understood from the following detailed description of a preferred embodiment thereof shown in the drawings, in which:

Fig. 1 is an external view in perspective of an apparatus constructed according to our invention in which certain parts have for clearness of illustration been omitted;

Fig. 2 is a view in perspective of a portion of the apparatus inside the housing of Fig. 1;

Fig. 3 is a front elevation of the apparatus of Fig. 1 showing certain of the inside portions thereof;

Fig. 4 is a ground plan view of the same apparatus cut along the line IV—IV of Fig. 3;

Fig. 5 is a part side elevation of the apparatus of Figs. 1 and 3 cut along the lines V—V of Fig. 3;

Fig. 6 is a detail side elevation showing the attachment of the housing of Fig. 1 to the framework of the apparatus at the base;

Fig. 7 is a detail plan view showing the attachment of the housing to vertical members of the framework at points removed from the base; and Fig. 8 is a detail side elevation showing the attachment of the housing to the framework in the neighborhood of the shaft bearings.

Referring to Fig. 1, 10 are foundation beams of the machine, here shown as imbedded in the floor 11, preferably concrete, of the factory building. On each of these beams is placed a heavy angle beam 12 having a bearing plate 13 welded on the upper face at each end thereof. These plates 13 provide footings for the main vertical columns 14, here shown as channels. The columns 14 are preferably welded to the footing plates 13 and supported and stiffened by gusset plates 15 welded both to the columns and to the footing plates.

An angle beam 16 is welded in horizontal position to the upper ends of the columns 14, the rear face of the angle beam 16 being flush with the rear face of the columns 14. A second angle beam 17 is welded to the inner faces of the columns 14 somewhat below and parallel to the first angle beam 16. Gusset plates 17' are provided to strengthen and stiffen the attachment of the angle beam 17 to the columns 14.

Vertical T columns 18 are welded between the cross beams 16 and 17 and form therewith a frame for supporting a bearing 19 (Fig. 3) in which the shaft of the machine turns as described below.

We provide a substantially identical structure at the rear of the machine, and maintain the front and rear structures in correct relative position by diagonal braces 20 fastened to the columns 14 by means of gusset plates 20' and stiffened at their point of crossing by a gusset plate 20''.

The horizontal base structure of the machine is shown in Fig. 4 as comprising a rigid rectangular framework of channel beams 21 and 22 welded at the corners, the end members 22 being securely bolted to the base angle beams 12. This rigid framework supports a floor 23 (Fig. 2) and a heat-insulating wall 24, the chamber so formed being normally completed by laterally removable covers later described. Rails 25 are provided for rolling an immersion tank described below in and out of this chamber. Rigidity is secured by placing the rails 25 directly over the beams 21 and bolting them directly thereto. Near the center of the framework 21, 22 cross beams 26 run between the channels 21 to provide a secondary framework to support the upper end of a hydraulic piston mechanism which, as later described, is employed to lift the immersion tank in connection with the dipping process.

The whole structure so far described constitutes a strong, well-braced mechanical support for all moving parts of the machine.

A housing 27, preferably a one-piece welded housing of light sheet metal, is tightly and securely attached at the lower part of the front and rear faces thereof to the base beams 12, in a manner to be described below, and not firmly attached to the front or rear end structures at any other points. Holes 28 are cut in the front and rear end faces of this housing to allow passage of the shaft of the dipping frame. This housing 27 bears windows and doors 29, 30 and 31 which are maintained tightly closed during the progress of the operations within the housing. They are attached by hinges and fastenings as shown or in any convenient manner, in order that they may be opened, the doors 30 for insertion and removal of the mold frames, the door 31 for insertion and removal of the immersion tank, and the windows 29 for cleaning. Since it is desirable to be able to observe the immersion process during its progress, we prefer to make the windows 29 and the doors 30 of glass. For heat insulation purposes, we prefer to employ double glass windows as more clearly shown in Fig. 5 in connection with the front and rear windows 30.

Referring now to Fig. 3, the immersion tank 32 mounted on rollers 33 may be rolled through the door 31 (Fig. 1), and on rails 25 into the housing 27 and the immersion chamber of Fig. 2. Since the immersion chamber extends the full length of the housing 27, the door 31 closes the chamber as well as the housing.

Inside of the housing, and rigidly bolted to the rear base beam 12 are vertical members 34 bearing rocker arms 35 for removing and replacing covers 36 which close the immersion tank 32 and the immersion chamber of Fig. 2. A hydraulic piston 37 is provided at the center of the base of the apparatus supported in the frame 21, 26. The piston 37 serves to raise the tank 32 into the dipping position and lower it when the dipping has taken place. Brackets 38 extend rearwardly from the piston 37 and are provided at their rear ends with pins 39 for actuating the levers 35 and so removing and replacing the covers 36 which slide in the guideways 40.

The laterally removable covers and associated mechanism are fully described and claimed in our copending application Ser. No. 218,324. They form no part of this invention, but we have found it advantageous to employ them in connection with the apparatus of this invention.

Referring to Fig. 5, a rotary mold frame carrier 41 is mounted on a shaft 42 which extends through the holes 28 in the housing 27 and is supported by bearings 19 firmly bolted to the cross beams 16, 17. The rear shaft extension bears a worm drive 43, 44 for continuous rotation of the mold frame carrier 41, and the front shaft extension bears a hand wheel 45 and a lever 46 for manual adjustment of the mold support into dipping position. A clutch mechanism 47 is provided at the rear of the machine for engaging the mold frame carrier 41 with the continuous drive 43, 44. The clutch 47 may be operated by any convenient lever mechanism in a well known manner.

The rotary mold frame carrier 41 is preferably arranged to bear four mold frames 48, spaced at 90° from one another as shown in Fig. 3, wherein a number of molds 48' are indicated on one of the frames.

The manner in which the housing 27 is attached to the supporting framework, according to the invention, will now be particularly described.

As stated above, the housing 27 is firmly secured at its front and rear ends to the base of the front and rear frameworks. Figs. 4 and 6 show the manner in which the end walls of the housing 27 are gripped between the base beams 12 and the channels 22. These points are chosen for the reason that, being at the floor level and close to the floor beams 10, they are less subject to vibration than any other points of the framework. Referring particularly to Fig. 6, a number of heavy bolts 49 pass through holes drilled in the downwardly extending flange of the base beam 12, through the housing 27 and through the web of the channel 22, and are drawn up tightly by the nuts 50. The vertical columns 14 and the base plates 13 are so placed that the rear faces of the webs of the columns 14 are not flush with the downwardly extending flange of the base beam 12, but slightly offset therefrom, the front columns forwardly and the rear columns rearwardly. Thus a small space is left between the vertical columns and the front and rear ends of the housing 27.

To prevent the light housing 27 from swaying about, we prefer to guide or support it on the framework at various other points, but it is desirable that such support shall not constitute a rigid attachment. A guiding support which may be employed in accordance with this invention at the upper ends of the columns 14 is shown in plan view in Fig. 7, in which the lower part of the figure represents the front of the machine. A bolt 51 passes through a hole drilled to size in the column 14 and through an oversized hole drilled in the housing 27. Surrounding the shank of the bolt 51 and on either side of the housing 27 are vibration-insulating washers 52. Any vibration-insulating substance may be employed, although we have found that good results can be obtained with oil-steeped asbestos. These washers 52 are held in place by a steel washer 53 below the head of the bolt 51 and compressed to provide a snug, but not a tight fit, by carefully turning up a nut 54 to the proper extent and holding it in proper position with a lock nut 55.

The front face of the housing 27 may additionally be supported by the horizontal beams 16 and 17 in the neighborhood of the shaft bearing 19, though it should by no means be firmly attached thereto. The guides or supports for the housing are here of the same character as those described above and shown in Fig. 7, it being desirable, in accordance with the invention, that vibration-insulating material be interposed wherever the housing 27 would otherwise come in contact directly with any part of the framework or with a nut or bolt secured thereto. In the case of these supports, we take advantage of the frame formed by the beams 16 and 17 and "T" members 18 to further support a sheet of padding material 56 to provide a gastight seal between the housing 27 and the shaft 42 where it passes through the holes 28 in the end walls of the housing 27. This sealing sheet 56, although not primarily for vibration-insulating purposes, may likewise be made of oil-steeped asbestos and is preferably supported on both sides, the support on one side being provided by the housing 27 itself and on the other side by a gusset plate 57, as shown in Fig. 8. The sealing sheet 56 and the supporting plate 57 may conveniently be attached to the beams 16 and 17 and the housing 27 by the bolts 51 which, with the vibration-insulating washers 52, provide the vibration-insulating support or guide for the housing 27.

By this construction and mode of attachment the housing 27 is entirely independent of the rest of the apparatus, particularly the moving parts. Being rigidly attached only at points of minimum vibration at the base, it is statically attached to the framework but dynamically separate from all parts of the framework which undergo any motion or are subjected to any vibration. We have found that vibrations of the kind to which the framework is subject are not transmitted to the housing 27 through the vibration-insulating washers 52 and that, even when the framework is subjected to shocks due to removing and replacing the covers 36 of the tank 32, lifting the tank 32 on the piston 37 for immersion, suddenly starting and stopping rotation of the mold frame carrier 41 and the like, the housing remains perfectly quiet and produces substantially none of the air waves which were characteristic of earlier apparatus. The high quality of the articles produced by the apparatus of our invention, and the freedom from the troublesome marks and rings above referred to, confirm our conclusion that these marks were due to air waves produced within the housing as a result of vibrations of the housing itself, which vibrations and the evil effects thereof can now be eliminated by the use of apparatus constructed in accordance with our invention.

We claim:

1. In a dipping machine, molds, a container for containing a bath of a plastic substance in liquid condition, means for dipping the molds in the bath to form films of said substance on the molds, said dipping means including a movable member capable of producing mechanical shocks when in operation, a framework supporting said movable member and positioned to receive said shocks and capable of being set into vibration by said shocks, and a housing enclosing said means for dipping the molds and insulated from the framework in a manner to prevent transmission of vibrations of the framework to the housing and production of air waves injurious to the films on the molds within the housing.

2. In a dipping machine, molds, a container for containing a bath of a plastic substance in liquid condition, means for dipping the molds in the bath to form films of said substance on the molds, said dipping means including a movable member on which the molds are mounted, which member is capable of producing mechanical shocks when in operation, a massive base, a framework mounted on said base and supporting said movable member and positioned to receive said shocks and capable of being set into vibration by said shocks and a housing enclosing said means for dipping the molds and said container for the bath, said housing being free of vibration-transmitting attachment to the framework and rigidly fixed to the base in a manner to prevent vibrations of the framework from producing air waves injurious to the films on the molds within the housing.

ALBERT BOECLER.
KURT BRATRING.